3,433,811
PRODUCTION OF 1,4-DIAMINOANTHRAQUINONE
Wolfgang Jentzsch, Ludwigshafen (Rhine), Germany, assignor to Badische Anilin- & Soda-Fabrik Aktiengesellschaft, Ludwigshafen (Rhine), Germany
No Drawing. Filed Dec. 14, 1965, Ser. No. 513,843
Claims priority, application Germany, Dec. 23, 1964,
B 79,870
U.S. Cl. 260—378  8 Claims
Int. Cl. C09b 1/20

This invention relates to a process for the production of 1,4-diaminoanthraquinone in which 1,4-diamino-2,3-dihydroanthraquinone is dehydrogenated in the presence of metallic or oxidic dehydrogenation catalysts.

In the production of 1,4-diaminoanthraquinone from 1,4-dihydroxyanthraquinone, 1,4-diamino-2,3-dihydroanthraquinone ("leucamine") is first obtained. Various methods are known for the oxidation of this leuco compound, including oxidation with excess nitrobenzene, which serves at the same time as a solvent, in the presence of acid or basic catalysts, such as hydrogen chloride, triethylamine or piperidine, and oxidation in concentrated sulfuric acid with pyrolusite or elementary chlorine. These reactions have various disadvantages in that undesirable by-products have to be removed from the reaction mixture and corrosion problems overcome when using elementary chlorine as oxidizing agent. Furthermore the yields of the prior processes are unsatisfactory, and when nitrobenzene is used the use of hydrogen chloride, triethylamine or piperidine is undesirable. It has therefore already been proposed that the acid or alkaline catalyst be omitted, since higher yields and a purer product are obtained when the reaction is carried out under reduced pressure so that the water formed during the oxidation is distilled off. In commercial operations, however, vacuum equipment is troublesome and expensive.

Hence a simpler and more economical method of manufacture has been desirable, even though 1,4-diaminoanthraquinone has been widely produced on a commercial scale for about 40 years.

It is an object of the invention to provide a process for the production of 1,4-diaminoanthraquinone which does not have the above-mentioned disadvantages and which will produce 1,4-diaminoanthraquinone in a smooth and simple reaction under mild conditions giving a practically quantitative yield of a very pure product. A further object is to provide a process which can be operated continuously.

Surprisingly, these objects are achieved by simply heating 1,4-diamino-2,3-dihydroanthraquinone in solution or suspension in an inert organic diluent in the presence of a metallic or oxidic dehydrogenation catalyst at a temperature of from 130° to 350° C., preferably from 135° to 280° C., until evolution of hydrogen ceases.

Metallic dehydrogenation catalysts which are suitable for the process according to the invention are finely divided metals of the Eighth Group of the Periodic System, particularly cobalt, nickel, platinum and palladium. Examples of suitable oxidic dehydrogenation catalysts are oxidic mixed catalysts of (a) oxides of copper, zinc or cadmium and (b) oxides of the elements of the fifth and sixth sub-groups, i.e. Groups V–B and VI–B, particularly of vanadium, chromium, molybdenum and tungsten.

Specific examples of catalysts are: finely divided platinum or palladium on conventional carrier materials, such as silica gel, alumina, aluminum oxide and magnesium oxide, and also Raney nickel, Raney cobalt, platinum oxide, copper oxide and chromium oxide, vanadium oxide, zinc oxide, or molybdenum oxide and cadmium oxide. Finely divided nickel (as Raney nickel or on a carrier such as silica gel) is preferred for technical reasons; in the case of supported catalysts the activity may be increased by the conventional method of adding small amounts of other metals, particularly copper or manganese and/or phosphoric acid.

Suitable diluents for the production of the solutions or suspensions of 1,4-diamino-2,3-dihydroanthraquinone are any organic liquids which are inert under the reaction conditions, which boil at above 130° C. and which can be recovered by distillation. Examples are: higher alcohols, such as hexyl alcohol, 2-ethylhexyl alcohol, glycol or oligoethylene glycols; cyclohexanone, trichlorobenzene, N-methylpyrrolidone, nitrobenzene, tetramethylurea, anisol, phthalic esters, terephthalic esters, glycol diacetate, quinoline and paraffin oil. These diluents are advantageously used in such amounts that a 5 to 30% solution or suspension is formed.

In the case of highly active types of catalyst, such as palladium, platinum oxide or Raney nickel, the dehydrogenation reaction begins at only about 140° C., proceeds very violently at 170° to 200° C. and is over in a short time. Somewhat higher temperatures are usually necessary in the case of the oxidic mixed catalysts.

The reaction may be carried out batchwise in a stirred vessel by suspending the powdered or finely granulated catalyst (used for example in amounts of 0.1 to 10%, preferably 0.5 to 5%, by weight with reference to 1,4-diamino-2,3-dihydroanthraquinone) or more advantageously continuously in a reaction tube. For this purpose the catalyst may be arranged as a fixed bed in a reaction tube which is capable of being heated and in which a solution of 1,4-diamino-2,3-dihydroanthraquinone flows or trickles through the catalyst bed. Hydrogen formed by the reaction is expelled with nitrogen or another inert gas, advantageously countercurrently.

The reaction mixture is worked up by conventional methods, for example by distillation or filtration, or by precipitation of the 1,4-diaminoanthraquinone by pouring into water. 1,4-diaminoanthraquinone is obtained in a quanttitative yield and in a very pure form.

The invention is further illustrated by the following examples. The parts specified in the examples are parts by weight.

EXAMPLE 1

A suspension of about 0.5 part of Raney nickel in N-methylpyrrolidone is added to 48 parts of leuco-1,4-diaminoanthraquinone in 250 parts of N-methylpyrrolidone and the mixture is heated up while stirring. Evolution of hydrogen begins at 145° C.; heating is continued for another thirty minutes to 185° C. by which time evolution of gas is practically at an end. The catalyst is filtered off by suction while hot, the filtrate is concentrated to one third of the initial volume and 1,4-diaminoanthraquinone is precipitated by pouring the reaction product into 2% sodium carbonate solution. The precipitate is filtered off and dried. 48 parts of 1,4-diaminoanthraquinone having a melting point of 268° to 270° C. is obtained. It is entirely homogeneous according to thin layer chromatography.

EXAMPLE 2

A porcelain reaction tube having a length of 800 mm. and a diameter of 35 mm. is charged with a 3 mm. granulate consisting of zinc oxide and ammonium vanadate in the weight ratio 1:1 and heated to 400° to 450° C. while passing through a weak current of nitrogen until elimination of water and ammonia has completely ended. A solution of 200 g. of 1,4-diamino-2,3-dihydroanthraquinone in 1000 g. of quinoline is dripped onto the catalyst in the contact tube thus prepared at 235° to 240° C. in the course of two hours. The solution leaving the contact tube is collected in a receiver, concentrated under subatmospheric pressure and the 1,4-diaminoanthraquinone is precipitated with hot water. 194 parts of pure 1,4-diaminoanthraquinone is obtained by suction filtration and drying.

EXAMPLE 3

48 parts of leuco-1,4-diaminoanthraquinone, 300 parts of cyclohexanone and 2 parts of a catalyst comprising 15% palladium on bone carbon carrier are boiled under reflux for two hours while stirring and passing through a weak current of nitrogen. The hot solution is filtered and about 200 parts of solvent is distilled off. The residue is poured into 1000 parts of warm water, and the precipitate is filtered off and dried. 46.5 parts of 1,4-diaminoanthraquinone is obtained which is chromatographically pure.

The same result is obtained with finely divided platinum (used as platinum oxide).

EXAMPLE 4

20 parts of leuco-1,4-diaminoanthraquinone, 200 parts of glycol diacetate and 1 part of a nickel oxide-copper oxide-silica gel catalyst are boiled under reflux for three hours while stirring. The product is worked up as described in Example 3. 20 parts of pure 1,4-diaminoanthraquinone is obtained.

The catalyst consists of rods of silicic acid which have been impregnated with 20% of nickel nitrate and 4% of cupric nitrate, heated to 400° C., reduced at this temperature with hydrogen and finally powdered.

EXAMPLE 5

The reaction tube described in Example 2 is filled with 4 mm. granulate of 10% ammonium vanadate and 90% cadmium oxide and the catalyst is pretreated in the way described in Example 2. A solution of 50 g. of leuco-1,4-diaminoanthraquinone in 500 ml. of N-methylpyrrolidone is trickled through the tube at a temperature of 200° C. in the course of ninety minutes. The reaction solution is poured into 3 liters of 2% sodium carbonate solution and worked up in the usual way. 46 g. of 1,4-diaminoanthraquinone is obtained which contains traces of the leuco compound.

EXAMPLE 6

The reaction tube described in Example 2 is charged with 4 mm. rods of silica gel which has been impregnated with 20% of nickel sulfate, heated to 420° to 425° C. and completely reduced with hydrogen. It is then cooled to 220° C. and first pure N-methylpyrrolidone and then 500 ml. of a 10% solution of leuco-1,4-diaminoanthraquinone in N-methylpyrrolidone is trickled through during the course of two hours. 48.5 g. of pure 1,4-diaminoanthraquinone is obtained.

I claim:
1. A process for the production of 1,4-diaminoanthraquinone which comprises heating to a temperature of from 130° to 350° C. 1,4-diamino-2,3-dihydroanthraquinone homogeneously distributed in an inert organic diluent in the presence of a dehydrogenation catalyst selected from the group consisting of a finely divided metal catalyst of the Eighth Group of the Periodic System and a mixed oxidic catalyst consisting essentially of two different oxides (a) and (b); (a) being selected from the group consisting of an oxide of copper, zinc and cadmium and (b) being selected from the group consisting of oxides of elements of Groups V–B and VI–B of the Periodic System.

2. A process according to claim 1 wherein the dehydrogenation catalyst is finely divided nickel.

3. A process according to claim 1 wherein the dehydrogenation catalyst is Raney nickel.

4. A process according to claim 1 wherein 0.1 to 10% by weight, with reference to 1,4-diamino-2,3-dihydroanthraquinone, of the catalyst is used.

5. A process according to claim 1 wherein the inert organic diluent has a boiling point at above 130° C. and can be recovered by distillation.

6. A process according to claim 1 wherein the ratio by weight of 1,4-diamino-2,3-dihydroanthraquinone to the inert organic diluent is between 1:20 and 1:3.

7. A process according to claim 1 wherein the reaction temperature is within the range of 135° to 280° C.

8. A process according to claim 1 wherein the reaction is carried out continuously by passing 1,4-diamino-2,3-dihydroanthraquinone distributed in an inert organic diluent through a fixed bed of the dehydrogenation catalyst in a reaction tube and passing an inert gas through the tube countercurrently.

References Cited

UNITED STATES PATENTS

| 2,215,555 | 9/1940 | Lord et al. | 260—378 XR |
| 2,215,556 | 9/1940 | Lord et al. | 260—378 XR |

LORRAINE A. WEINBERGER, *Primary Examiner.*

H. C. WEGNER, *Assistant Examiner.*